United States Patent
Segal et al.

(10) Patent No.: US 10,867,455 B2
(45) Date of Patent: Dec. 15, 2020

(54) DIAGNOSTICS, PROGNOSTICS, AND HEALTH MANAGEMENT FOR VEHICLES USING KINEMATIC CLUSTERS, BEHAVIORAL SENSOR DATA, AND MAINTENANCE IMPACT DATA

(71) Applicant: AppliedEA, Inc., Nashville, TN (US)

(72) Inventors: Yehoshua Mordechai Segal, New York, NY (US); Ryan Conrad Kohl, New York, NY (US)

(73) Assignee: AppliedEA, Inc., Nashville, TN (US)

( * ) Notice: Subject to any disclaimer, the term of this patent is extended or adjusted under 35 U.S.C. 154(b) by 131 days.

(21) Appl. No.: 16/165,854

(22) Filed: Oct. 19, 2018

(65) Prior Publication Data

US 2019/0180527 A1 Jun. 13, 2019

Related U.S. Application Data

(60) Provisional application No. 62/575,981, filed on Oct. 23, 2017, provisional application No. 62/575,331, filed on Oct. 20, 2017.

(51) Int. Cl.
| | | |
|---|---|---|
| *G07C 5/08* | (2006.01) | |
| *G06N 20/00* | (2019.01) | |
| *G07C 5/00* | (2006.01) | |
| *G05B 23/02* | (2006.01) | |

(52) U.S. Cl.
CPC ....... *G07C 5/0808* (2013.01); *G05B 23/0283* (2013.01); *G06N 20/00* (2019.01); *G07C 5/008* (2013.01)

(58) Field of Classification Search
CPC .. G07C 5/0808; G07C 5/008; G05B 23/0283; G06N 20/00
See application file for complete search history.

(56) References Cited

U.S. PATENT DOCUMENTS

| | | |
|---|---|---|
| 6,122,572 A | 9/2000 | Yavnai |
| 2011/0173496 A1 | 7/2011 | Hosek et al. |
| 2011/0307220 A1* | 12/2011 | Lacaille ............ G05B 23/0281 702/185 |
| 2015/0199854 A1 | 7/2015 | Olsen, III et al. |
| 2016/0129919 A1* | 5/2016 | Kubo .................... G08G 1/167 340/441 |
| 2016/0299506 A1 | 10/2016 | Bruggeman et al. |
| 2017/0301247 A1 | 10/2017 | Sherry et al. |

FOREIGN PATENT DOCUMENTS

WO   WO-2017079219 A1   5/2017

* cited by examiner

*Primary Examiner* — Yuen Wong
(74) *Attorney, Agent, or Firm* — Mintz Levin Cohn Ferris Glovsky and Popeo, P.C.

(57) ABSTRACT

Machine learning based methods for vehicle maintenance are disclosed. In one aspect, there is a method that includes uploading a flight dataset. The flight dataset includes timestamped vectors of kinematic and behavioral sensor data elements acquired by on-board sensors. The method further includes assigning each timestamped vector of the flight dataset to a kinematic cluster. The method further includes identifying behavioral sensor data that is anomalous for the assigned kinematic cluster of the timestamped vector. The method further includes generating an alert criticality score for each combination of kinematic cluster and behavioral sensor with anomalous sensor data.

20 Claims, 12 Drawing Sheets

DIAGNOSTICS, PROGNOSTICS, AND HEALTH MANAGEMENT FOR VEHICLES USING KINEMATIC CLUSTERS, BEHAVIORAL SENSOR DATA, AND MAINTENANCE IMPACT DATA

CROSS REFERENCE TO RELATED APPLICATIONS

The present application claims priority to U.S. Patent Application No. 62/575,331, filed Oct. 20, 2017, entitled DIAGNOSTICS, PROGNOSTICS, AND HEALTH MANAGEMENT FOR AIRCRAFT USING FLIGHT REGIME TRENDS AND MAINTENANCE DATA and U.S. Patent Application No. 62/575,981, filed Oct. 23, 2017, entitled DIAGNOSTICS, PROGNOSTICS, AND HEALTH MANAGEMENT FOR AIRCRAFT USING CLUSTERED MOBILITY INDICATORS, the disclosures of which are incorporated herein by reference in their entirety.

TECHNICAL FIELD

The present disclosure generally relates to machine learning for vehicle diagnostics, prognostics, and health management, using kinematic clusters, behavioral sensor data, and maintenance impact data.

BACKGROUND

Effective maintenance is essential for passenger safety, to meet regulatory requirements, and to extend the life of aircraft and other vehicles. On-board kinematic and behavioral sensors make it possible to collect data about engines, flight controls, cockpit controls, and other components. Kinematic sensor measurements may be used to describe vehicle kinematics, including position, velocity, and acceleration. Behavioral sensor measurements may measure the performance or condition of vehicle systems and subsystems. Anomalous or unexpected behavioral sensor readings may drive preventive maintenance actions, and be used to predict or diagnose faults. However, existing systems may not consider vehicle kinematics when determining whether a behavioral sensor reading is anomalous or out-of-bounds.

SUMMARY

Systems, methods, and articles of manufacture, including computer program products, are provided for diagnostics, prognostics and health management for aircraft, ground vehicles, surface ships, underwater vessels, satellites, missiles, trains, robots, industrial equipment, and other vehicles. In one aspect, there is a method that includes uploading a flight dataset. The flight dataset includes timestamped vectors of kinematic sensor data elements and behavioral sensor data elements. Each kinematic sensor data element and each behavioral sensor data element is acquired by at least one sensor on board a vehicle. The method further includes assigning each timestamped vector of the flight dataset to a kinematic cluster. The method further includes identifying behavioral sensor data that is anomalous for the assigned kinematic cluster of the timestamped vector. The method further includes generating an alert criticality score for each combination of kinematic cluster and behavioral sensor with anomalous sensor data. The method further includes aggregating the generated alert criticality scores into a first alert vector. The method further includes identifying previous flights with an alert vector similar to the first alert vector, the identified previous flights having subsequent maintenance actions and follow-on flights. The method further includes generating an impact score for each of the identified previous flights of the respective maintenance action on the respective follow-on flight. The method further includes generating a composite impact score for each maintenance action. The method further includes selecting the maintenance action with the largest composite impact score.

In optional variations one or more additional features, including but not limited to the following, can be included in any feasible combination. For example, the vehicle may be a fixed wing aircraft, a rotary wing aircraft, a ground vehicle, a surface ship, or a subsurface ship. The vehicle may be an autonomous vehicle, a remotely controlled vehicle, or a piloted vehicle. Each timestamped vector may include a vehicle identifier, a timestamp, at least one kinematic sensor reading, and at least one behavioral sensor reading. Each timestamped vector may include a vehicle type, a version number, an engine type, and/or a pilot identifier. The method may include labeling a flight dataset element as a kinematic sensor data element or a behavioral sensor data element. The method may include generating the kinematic clusters by clustering a training set of timestamped kinematic sensor vectors from multiple flight datasets using a clustering method. The clustering method may be a MAPPER algorithm. The clustering method may be a k-means clustering algorithm or a hierarchical clustering algorithm. The behavioral sensor value may be anomalous for a corresponding kinematic cluster when the behavioral sensor value differs from the expected sensor value for the corresponding kinematic cluster by more than a normalized threshold. The distribution of the behavioral sensor value for the corresponding kinematic cluster may be a Gaussian distribution. The normalized threshold may correspond to a z-score of two or three standard deviations. The behavioral sensor data elements for a kinematic cluster may be filtered with a double exponential moving average filter. Generating the alert criticality score for each combination of kinematic cluster and behavioral sensor with anomalous sensor data may include ordering the timestamped vectors of kinematic sensor data and behavioral sensor data for each kinematic cluster by time. Generating the alert criticality score for each combination of kinematic cluster and behavioral sensor with anomalous sensor data may include computing, over a time window, each alert criticality score as the absolute value of the difference between a stationary average and a moving average of the corresponding behavioral sensor, divided by the moving average of the corresponding behavioral sensor. Generating the alert criticality score for each combination of kinematic cluster and behavioral sensor with anomalous sensor data may include comparing each alert criticality score to a minimum threshold for an alert. The first alert vector may include at least one ordered pair of a behavioral sensor labels paired with an anomalous behavioral sensor value that exceeds an alert criticality threshold. The alert vector for the previous flight may be similar to the first alert vector when a distance between the alert vector for the previous flight and the first alert vector is less than a threshold in a behavioral sensor value space. The distance between the alert vector for the previous flight and the first alert vector may be a normalized Mahalanobis distance. Each impact score may quantify the impact of the maintenance action on the corresponding follow-on flight by summing the differences between alert criticality scores for each behavioral sensor for the follow-on flight after the maintenance action from the corresponding alert criticality scores for each behavioral sensor from the previous flight before the maintenance action. Generating a composite impact score for each maintenance action may include determining an average impact score for the follow-on flights following each respective maintenance action.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
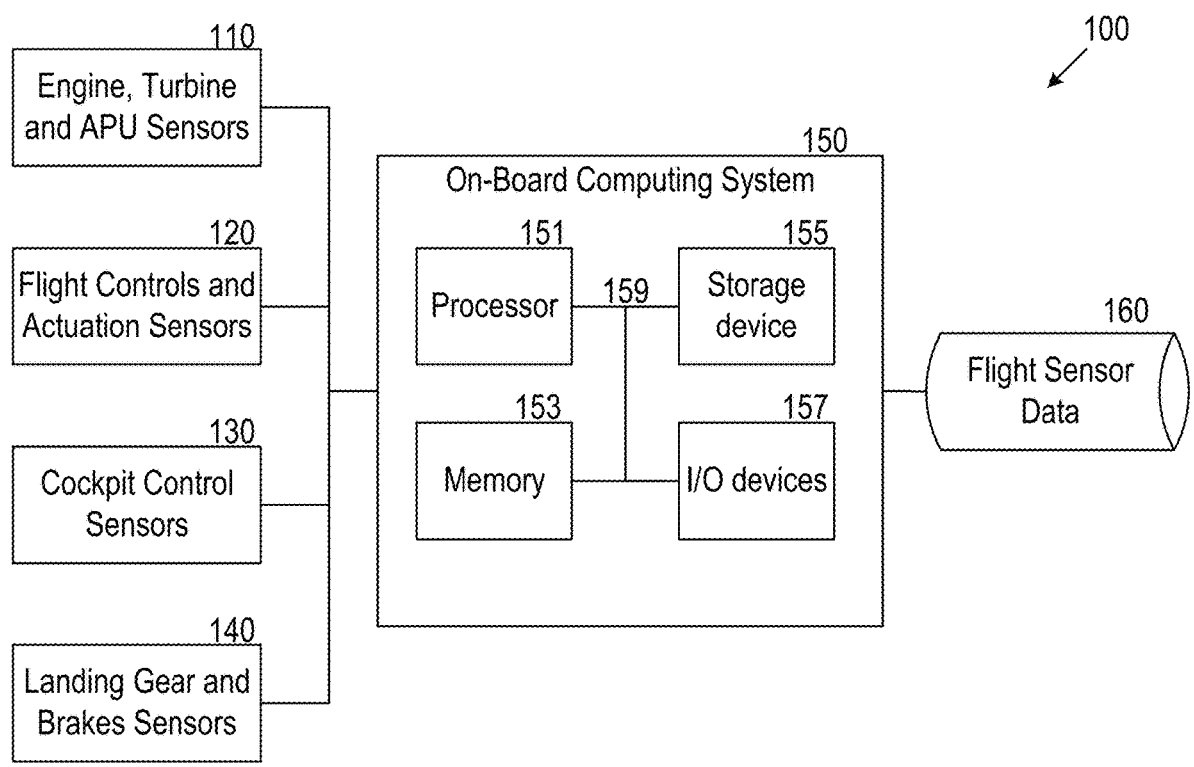
FIG. 1A is a system diagram of a system for collecting flight sensor data for use in some example embodiments.

Advances in sensor technology, signal processing, communications, and computing technology make it possible to equip aircraft, ground vehicles, surface ships, and underwater vessels with a broad range of kinematic and behavioral sensors. Kinematic sensors measure vehicle acceleration, velocity, position, and location. Behavioral sensors measure performance and the condition of vehicle systems and subsystems. By taking sensor measurements during the course of a flight (or trip, for ground and seaborne vehicles), vehicle kinematics, condition, and performance can be quantified over time.

Vehicle health management systems, diagnostic systems, and prognostic systems use anomalous or out-of-bounds behavioral sensor readings to identify system or subsystem faults, potential faults, and maintenance needs. One approach is to identify those readings that are not within normal limits. For example, if readings for a behavioral sensor follows a normal distribution, then those readings that are either above or below the mean by more than three standard deviations (or another designated threshold) can be designated as unexpected or anomalous.

However, the underlying distribution of expected readings for a behavioral sensor may vary with different flight paths, flight regimes, and vehicle maneuvers. Such maneuvers and flight regime trends may be grouped in kinematic clusters. For example, a first kinematic cluster can include time intervals when an aircraft is accelerating and ascending, such as during an initial ascent right after takeoff. A second kinematic cluster can include time intervals when the aircraft is cruising at a constant speed and constant elevation. We expect engines to rev higher and run hotter, and for there to be greater forces measured, when an aircraft is accelerating and ascending than when the aircraft is cruising at a constant speed and acceleration. Therefore, we expect engine RPM values and temperatures measured by engine behavioral sensors to be higher for the first kinematic cluster, when the aircraft is accelerating and ascending, than for the second kinematic cluster, when the aircraft is cruising at a constant speed and acceleration. Similarly, we expect higher forces on flight actuator components for the first kinematic cluster than for the second kinematic cluster. As a result, behavioral sensor values that are normal for one kinematic cluster can be out-of-bounds or anomalous for another kinematic cluster. These examples illustrate the need to consider kinematic clusters when identifying anomalous behavioral sensor readings.

The disclosed technology includes machine learning based systems and methods for diagnostics, prognostics and health management for aircraft using kinematic clusters to maintain aircraft, ground vehicles, surface ships, and underwater vessels. The systems and methods may rely on data collected by sensors, which may be represented in data sets. Such data sets may be structured in spreadsheets, structured files, or databases. The data sets may be stored on-board vehicles, at maintenance depots, or at other locations accessible by an internet or intranet via wired or wireless communications. The data may be combined with maintenance models, diagnostic tools, prognostic analytics, or vehicle health management models for aircraft, engine, or avionics systems performance. The models, tools and analytics may incorporate one or more machine learning based techniques for identifying kinematic clusters and quantifying variations from expected performance.

For clarity, many of the examples herein refer to an aircraft, a flight, or a flight dataset. However, the disclosed technology applies to ground vehicles, surface ships, underwater vehicles, satellites, missiles, trains, robots, industrial equipment, and other vehicles. As used herein, a vehicle may refer to any object that moves. A vehicle may transport people or cargo. The term "flight" as applied to vehicles that don't fly corresponds to trips or journeys on land or sea, or more generally an elapsed time segment during which a vehicle moves. The term "flight dataset" corresponds to the set of sensor data collected during a flight. The sensors may be on-board the vehicle. In various embodiments, one or more sensors may be off-board the vehicle.

A flight phase or a flight regime may be a portion of a flight. Flight phases or flight regimes may have a categorical value that refers to a set of flight data rows that are all similar in terms of kinematics. For example, flight data rows in a flight phase or regime that are nearby in a multidimensional space defined by each kinematic and associated metric have similar kinematic values.

A kinematic cluster may be a set of flight points that are similar with respect to their kinematic values. A kinematic cluster is formed by a flight phase or a flight regime for which timestamped vectors, or flight data rows, are clustered in a multidimensional space defined by kinematic sensor readings. A kinematic value may be a recorded value of a flight point that represents the motion of the mobile platform. Examples include pitch, roll, yaw, velocity and acceleration.

A flight regime span may be a continuous period of time during a flight where all time instances are associated with the same flight regime.

A flight regime trend may be a description of the numerical values derived from one or more sensors while a vehicle is moving within a particular flight regime. This description may include the average value and variation of sensor data while the vehicle is in a flight regime, as well as whether and how those values have been changing over time. A flight point may be a datum representing the recorded values of a mobile platform for a small duration of time (e.g., 0.25 seconds or a different duration).

A sensor value may be a recorded value of a flight point that are not kinematic values and that represent the behavior of the systems contributing to the platform's motion. Examples include vibration, RPM, oil temperature, and electric current.

A fault may be a problem with the operation of a mobile platform, such as a failure of an onboard system. A fault may be detected when one or more sensor values is out of an acceptable operating range.

A key internal indicator may be a range of values across a set of sensors that indicates an imminent fault.

A maintenance datum may be a representation of a discrete maintenance action (often a repair or replacement of parts) performed during a (possibly discontinuous) period of time on a single vehicle.

A follow-on flight is a flight that is carried out after a maintenance action.

A vehicle health indicator may be a numerical value representing how close to 'normal' a vehicle is operating, relative to pre-defined behavioral sensor value thresholds or to historical behaviors of this or other vehicles.

The impact of a maintenance action quantifies the improvement in a vehicle health indicator in at least one follow-on flight after the maintenance action.

FIG. 1A is a system diagram of a system 100 for collecting flight sensor data on an aircraft. The aircraft includes a wide variety of on-board sensors, including, for example, engine, turbine, and auxiliary power unit (APU) sensors 110, flight controls and actuation sensors 120, cockpit control sensors 130, and landing gear and brakes sensors 140. Modern aircraft may include tens, hundreds or thousands of kinematic and behavioral sensors. An on-board computing system 150 may include at least one processor 151, a memory 153, a storage device 155, and input/output devices 157. The at least one processor 151, the memory 153, the storage device 155, and the input/output devices 157 may be interconnected via a system bus 159. The at least one processor 151 is capable of processing instructions for execution within the computing system 150. The at least one processor 151 is capable of processing instructions stored in the memory 153 and/or on the storage device 155 to display graphical information for a user interface provided via the input/output device 157.

The memory 153 is a computer readable medium such as volatile or non-volatile memory that stores information within the computing system 150. The storage device 155 is capable of providing persistent storage for the computing system 150. The storage device 155 may be a floppy disk device, a hard disk device, an optical disk device, a tape device, or any other suitable persistent storage means. The input/output device 157 provides input/output operations for the computing system 150. In some example embodiments, the input/output device 157 includes a keyboard and/or pointing device. In various implementations, the input/output device 157 includes a display unit for displaying graphical user interfaces.

According to some example embodiments, the input/output device 157 may provide input/output operations for a network device on board the aircraft.

The on-board computing system 150 outputs flight sensor data 160, which includes the measurements from the engine, turbine, and auxiliary power unit (APU) sensors 110, flight controls and actuation sensors 120, cockpit control sensors 130, and/or landing gear and brakes sensors 140 during the course of a flight. Such data can be downloaded from the aircraft after a flight, or streamed to a maintenance system during a flight.

The flight sensor data 160 includes time stamped vectors of kinematic sensor data elements and behavioral sensor data elements, collected during the course of a flight. Each timestamped vector includes a date and time ("datetime"), at least one kinematic sensor data element, and at least one behavioral sensor data element. For example, the kinematic (kinematic) data may include acceleration, yaw, pitch, acceleration, and throttle position. The behavioral sensor data may include an oil pressure, RPM, engine torque, temperature, or a voltage level. For some embodiments, each timestamped vector includes a vehicle identifier. For some embodiments, each timestamped vector may be stored in a flight datum represented as a row in a data set that includes a vehicle serial number or identifier, kinematic sensor values, and behavioral sensor values. For some embodiments, each of the kinematic sensor values and the behavioral sensor values within a single timestamped vector were measured by an onboard sensor at substantially the same time. For some implementations, each flight dataset, and their corresponding timestamped vectors, also includes descriptive data, such as the name or identifier of an operator, vehicle type, or data that may be relevant to vehicle operations and maintenance, such as ambient conditions under which the vehicle is operating.

The timestamped vectors may be arranged in sequential order to form time series data. A flight data set of flight sensor data 160 may include sensor readings from multiple flight phases of a flight.

Figure 1B:
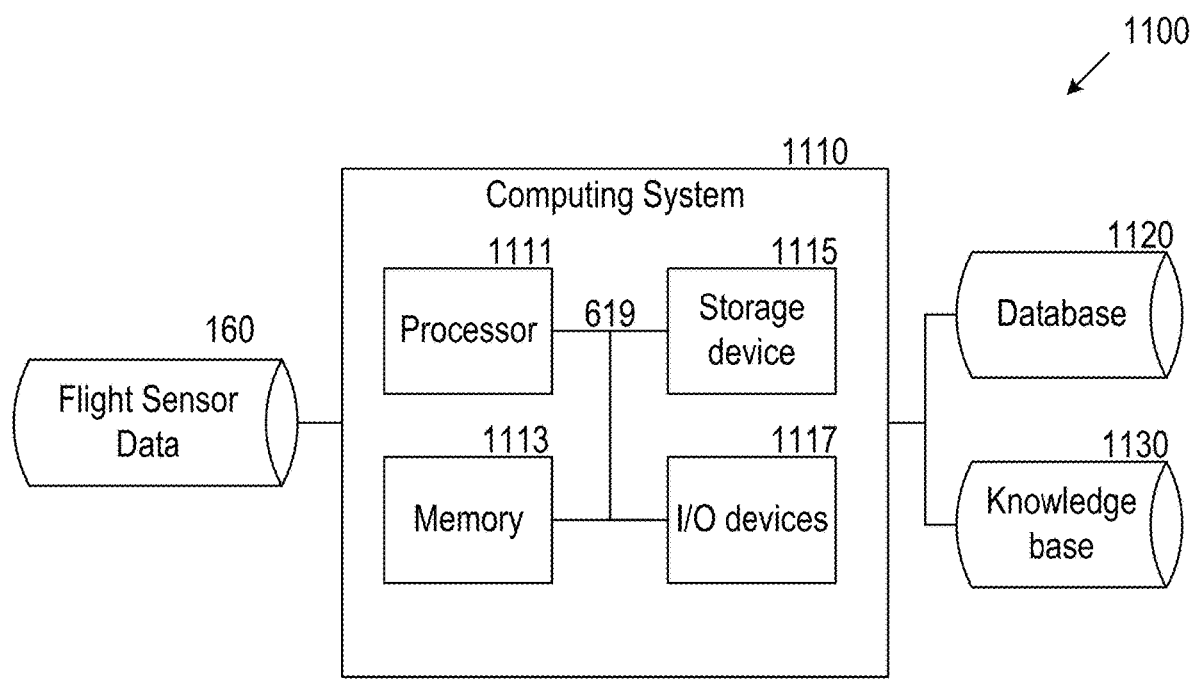
FIG. 1B depicts a system diagram illustrating a vehicle maintenance system, in accordance with some example embodiments.

FIG. 1B depicts a system diagram illustrating a vehicle maintenance system 1100, in accordance with some example embodiments. The system 1100 and the system 100 may be communicatively coupled via a wired and/or wireless network including, for example, a wide area network (WAN), a local area network (LAN), a public land mobile network (PLMN), the Internet, and/or the like.

Flight sensor data 1160 includes timestamped kinematic sensor data and behavioral sensor data, as described above with respect to FIG. 1. The vehicle management system includes a computing system 1110. Computing system 1110 may include at least one processor 1111, a memory 1113, a storage device 1115, and input/output devices 1117. The at least one processor 1111, the memory 1113, the storage device 1115, and the input/output devices 1117 may be interconnected via a system bus 1119. The at least one processor 1111 is capable of processing instructions for execution within the computing system 1110. The at least one processor 1111 is capable of processing instructions stored in the memory 1113 and/or on the storage device 1115 to display graphical information for a user interface provided via the input/output device 1117.

The memory 1113 is a computer readable medium such as volatile or non-volatile memory that stores information within the computing system 1110. The storage device 1115 is capable of providing persistent storage for the computing system 1110. The storage device 1115 may be a floppy disk device, a hard disk device, an optical disk device, or a tape device, or other suitable persistent storage means. The input/output device 1117 provides input/output operations for the computing system 1110. In some example embodiments, the input/output device 1117 includes a keyboard and/or pointing device. In various implementations, the input/output device 1117 includes a display unit for displaying graphical user interfaces.

According to some example embodiments, the input/output device 1117 may provide input/output operations for a network device. For example, the input/output device 1117 may include Ethernet ports or other networking ports to communicate with one or more wired and/or wireless networks (e.g., a local area network (LAN), a wide area network (WAN), the Internet).

In some example embodiments, the computing system 1110 may be used to execute various interactive computer software applications for vehicle maintenance that may be used for organization, analysis and/or storage of data in various formats. Upon activation within the applications, the functionalities may be used to generate the user interface provided via the input/output device 1117. The user interface may be generated and presented to a user by the computing system 1110 (e.g., on a computer screen monitor, etc.).

The database 1120 and knowledge base 1130 each may be any type of database including, for example, an in-memory database, a relational database, a non-SQL (NoSQL) database, and/or the like. The database 1120 may hold flight sensor data for flights, flight regimes or phases, flight regime spans, flight regime trends, kinematic cluster, maintenance data, fault data, alert vectors, maintenance impact data, vehicle health indicators, and maintenance recommendations. The knowledge base 1130 may include aircraft and aircraft maintenance information from the manufacturer. The database 1120 and knowledge base 1130 each may be distributed or federated, and or accessible via a network.

Portions or all of the maintenance system 1100 may be housed at an organization level (O-level) maintenance facility, at an intermediate level (I-level) maintenance facility, at a depot level (D-level) facility, on a network, and/or on board an aircraft.

Figure 2:
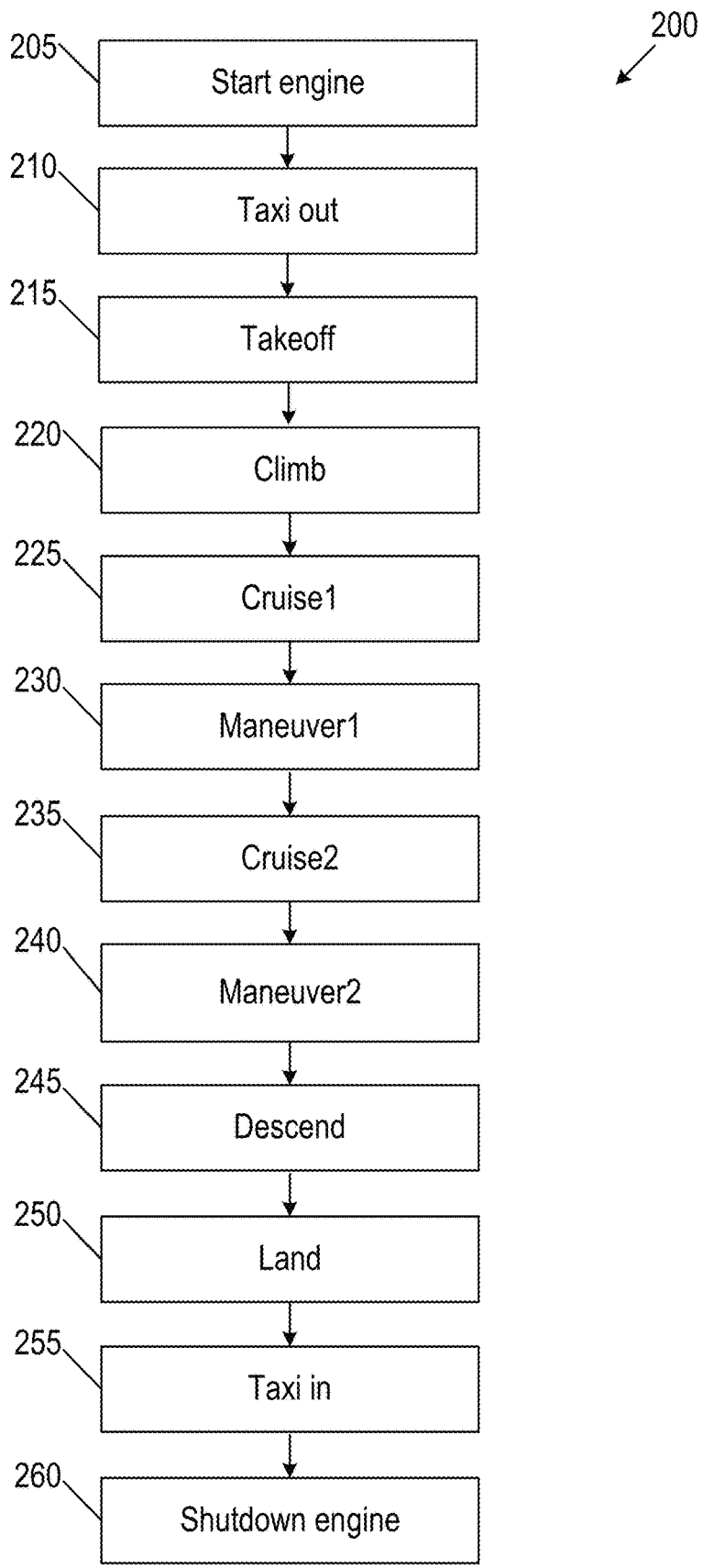
FIG. 2 is a flowchart of phases of a flight that correspond to kinematic clusters of an aircraft.

FIG. 2 is an example of a flowchart of phases of a flight. Each phase has different expected kinematic characteristics. At start engine 205, the aircraft is on the ground and not moving. During taxi out 210, the aircraft remains on the ground as it accelerates along a runway. During takeoff 215, the aircraft lifts off the ground. During climb 220, the aircraft keeps accelerating, points up, and ascends towards a cruising elevation. During cruise1 225, the aircraft maintains a substantially constant first elevation, first bearing, and first velocity. During maneuver1 230, the aircraft banks right and increases velocity. During cruise2 235, the aircraft maintains a substantially constant second elevation, second bearing, and second velocity. During maneuver2 240, the aircraft banks left, ascends, and decreases velocity. During descend 245, the aircraft points towards the ground, decelerates, and loses elevation. During land 250, the aircraft touches down on the ground. During taxi in 255, the aircraft is on the ground as it decelerates along a runway. At stop engine 260, the aircraft is on the ground and not moving. Each of the flight phases for the example flight of FIG. 2 have different expected kinematic profiles.

Figure 3:
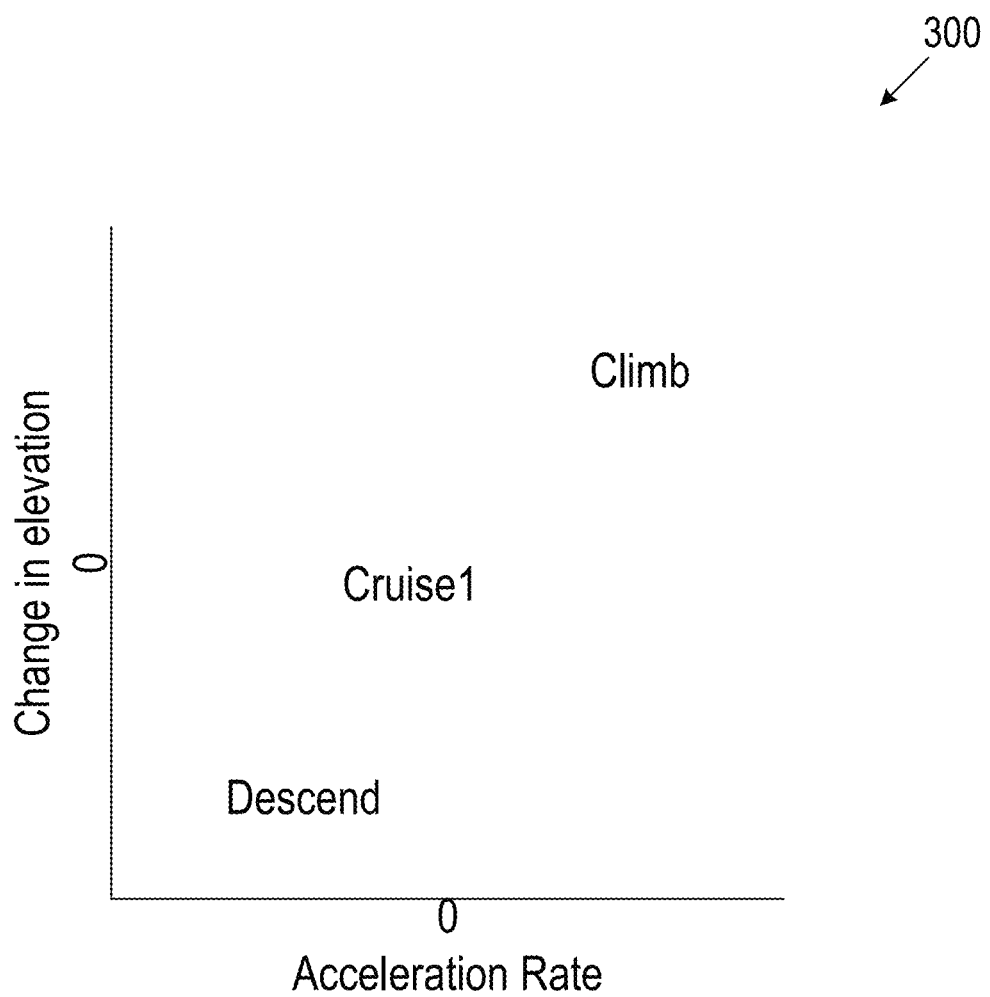
FIG. 3 depicts the relationship between phases of a flight and kinematic sensor readings.

FIG. 3 shows an example of how kinematic sensor data can be used to separate different flight phases into separate kinematic clusters. FIG. 3 is a graph with two kinematic dimensions. The first dimension in the x-direction is acceleration rate, and the second dimension in the y-direction is the change in direction.

As aircraft climb, they accelerate at a high rate to increased elevation. Therefore, timestamped vectors cluster in FIG. 3 at high acceleration rates and high changes in elevation as an aircraft climbs.

In contrast, as aircraft descend, they lose elevation and may decelerate. Therefore timestamped vectors cluster at negative acceleration rates and negative changes in elevation as an aircraft descends.

Cruising aircraft cluster close to zero change in elevation, and zero acceleration rate, because cruising aircraft may maintain substantially constant elevation and a substantially constant speed.

The climb, descend, and cruise kinematic clusters occupy different regions in a kinematic space defined by acceleration rate and change in elevation. Timestamped vectors from these three flight phases can be assigned to their respective kinematic cluster based on which cluster they are closest to. Additional kinematic sensor measures, or combinations of these measures, may be used by machine learning methods to generate kinematic clusters, corresponding to flight phases, and assign timestamped vectors to the kinematic clusters once they have been assigned. This makes is possible to estimate a probability distribution function (PDF) for a behavioral sensor for each kinematic cluster, or a combination of behavioral sensors for each kinematic cluster, instead of just estimating the PDF across all clusters. Anomalous or out-of-bounds behavioral sensor reading thresholds can be customized for each kinematic cluster or corresponding flight phase, as illustrated in FIGS. 4A-4E.

Figure 4A:
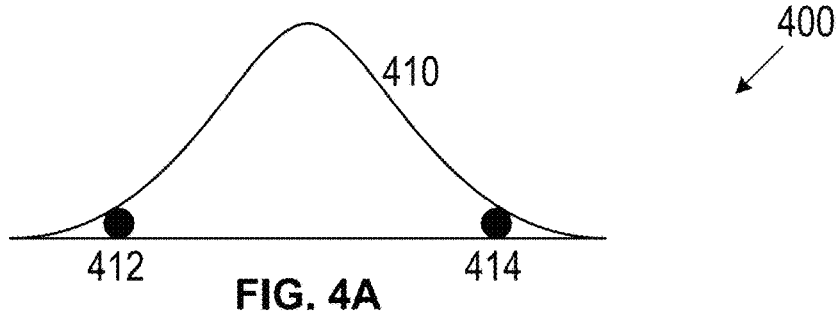
FIG. 4A illustrates a probability distribution function (PDF) of a behavioral sensor reading, across multiple kinematic clusters.
Figure 4B:
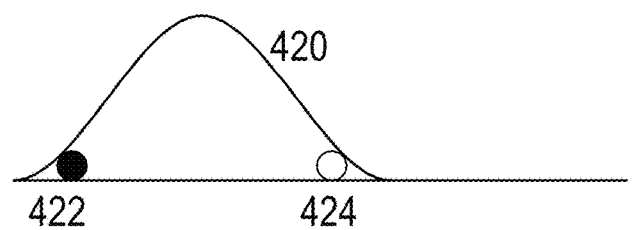
FIG. 4B illustrates a PDF of the behavioral sensor reading of FIG. 4A, for a first kinematic cluster.
Figure 4C:
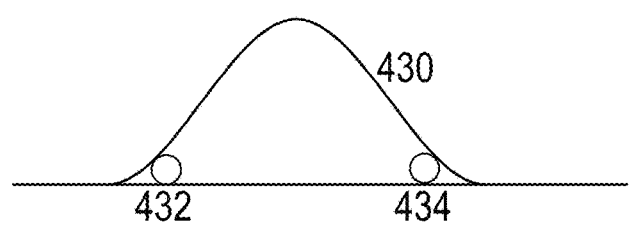
FIG. 4C illustrates a PDF of the behavioral sensor reading of FIG. 4A for a second kinematic cluster that partially overlaps the PDF of the behavioral sensor reading for the first kinematic cluster illustrated in FIG. 4B.
Figure 4D:
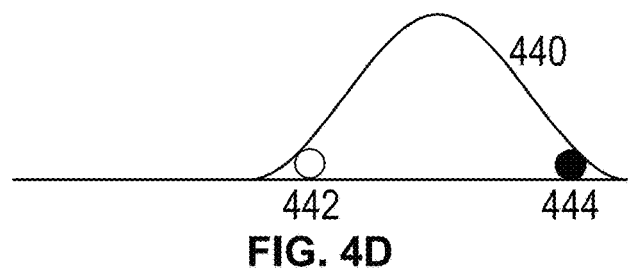
FIG. 4D illustrates a PDF of the behavioral sensor reading of FIG. 4A for a third kinematic cluster that partially overlaps the PDF of the behavioral sensor readings for the first and second kinematic clusters illustrated in FIGS. 4B and 4C, respectively.

FIG. 4A illustrates a PDF 410 of a behavioral sensor reading, across multiple flights and multiple flight phases, without regard to flight phase or kinematic cluster. The PDF 410 follows a normal distributions with lower tail 412 and upper tail 414. Sensor readings in the tails may be interpreted as anomalous or out-of-bounds. FIGS. 4B, 4C, and 4D take into account flight phases and their associated kinematic clusters.

FIG. 4B illustrates a PDF 420 for a first kinematic cluster, with lower tail 422 and upper tail 424 for anomalous or out-of-bounds readings. The lower tail 422, with a filled in black circle, is within tail 412 of PDF 410, and would have been recognized as anomalous or out-of-bounds by PDF 410. However, the upper tail 424 is close to the peak of PDF 410, and would not have been flagged by PDF 410.

FIG. 4C illustrates a PDF 430 for a second kinematic cluster that partially overlaps the PDF 420 for the first kinematic cluster illustrated in FIG. 4B. Neither the lower tail 432 nor the upper tail 434 overlaps one of the tails of PDF 410. Therefore, few if any sensor readings for the second kinematic cluster would be flagged as anomalous or out-of-bounds by PDF 410.

FIG. 4D illustrates a PDF 440 for a third kinematic cluster that partially overlaps the PDF of the behavioral sensor readings for the first and second kinematic clusters illustrated in FIGS. 4B and 4C, respectively. The lower tail 442 is close to the peak of PDF 410, and would not have been recognized as anomalous or out-of-bounds by PDF 410. Only the upper tail 444 would have been flagged by PDF 410.

Figure 4E:
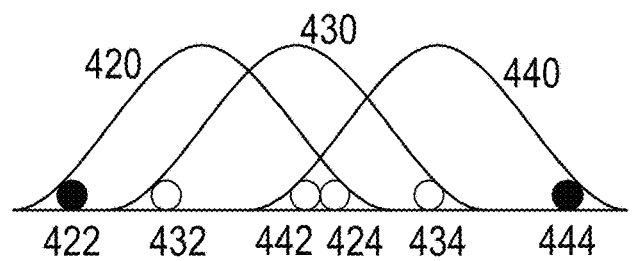
FIG. 4E illustrates the PDF of the behavioral sensor readings of FIG. 4A, for the first, second, and third kinematic clusters in FIGS. 4A, 4B, and 4C.

FIG. 4E brings together FIGS. 4B, 4C, and 4D onto a single graph, and illustrates that only the lower tail 422 of PDF 420 for the first kinematic cluster and the upper tail 444 of PDF 440 for the third kinematic cluster would be recognized as anomalous or out-of-bounds by PDF 410. The remaining tails of PDF 420, PDF 430, and PDF 440 would not be recognized as anomalous our out-of-bounds by PDF 410. These figures illustrate the importance of considering flight phases and their corresponding kinematic clusters when determining if a behavioral sensor reading is anomalous or out-of-bounds.

Figure 5:
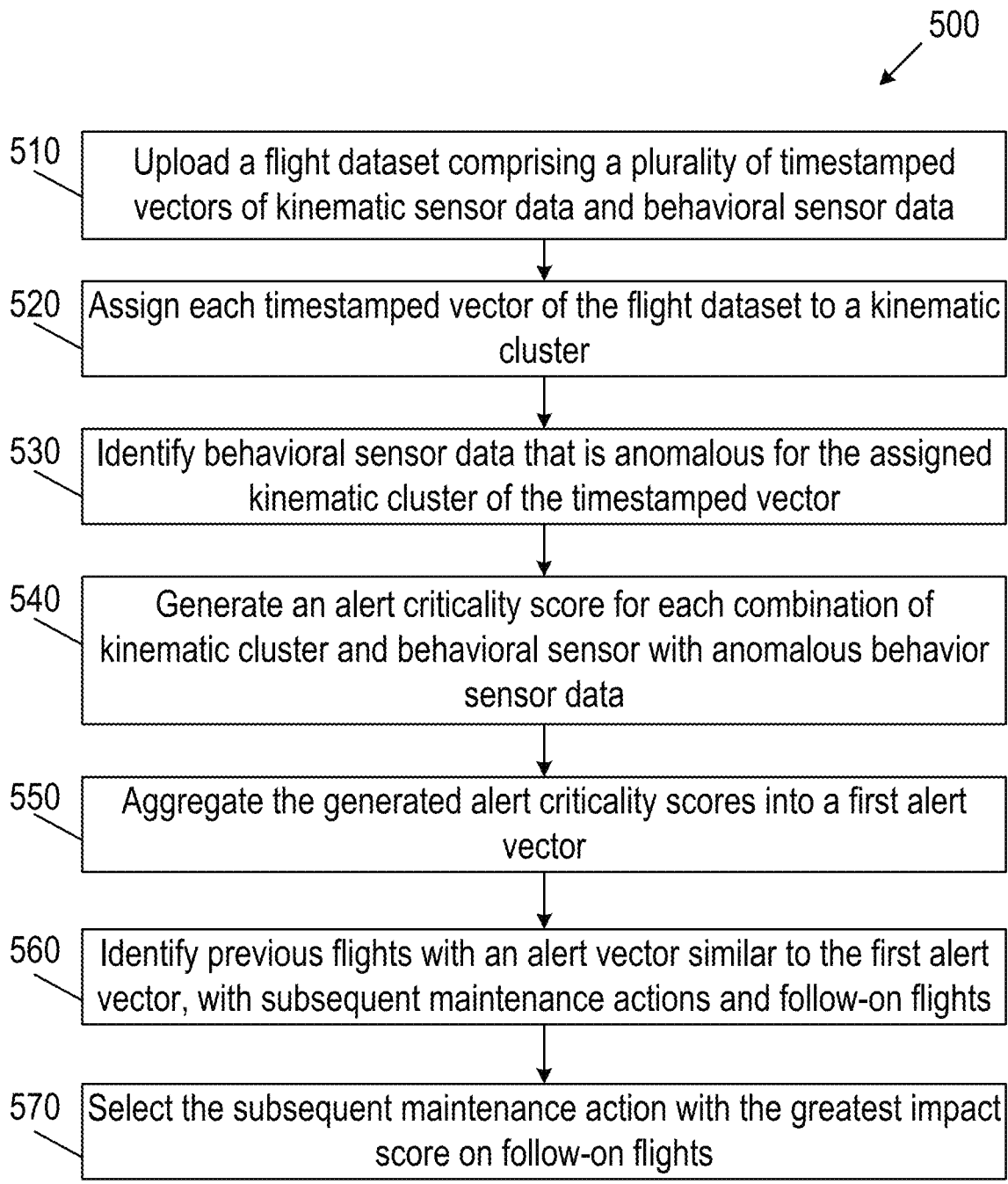
FIG. 5 is a flowchart of a method of maintaining an aircraft using kinematic clusters, behavioral sensor data, and maintenance impact data, in accordance with some example embodiments.

FIG. 5 is a flowchart of a process 500 of maintaining a vehicle using kinematic clusters, behavioral sensor data, and maintenance impact data, in accordance with some example embodiments. Referring to FIGS. 1A, 1B, and 5, the process 500 may be performed by the computing system 1100. In various embodiments, the vehicle may be a fixed wing aircraft, a rotary wing aircraft, a ground vehicle, a surface ship, or a subsurface ship. The vehicle may be autonomous, remotely controlled, or piloted.

At 510, the computing system 1100 uploads a flight dataset, which includes flight sensor data 160. The flight dataset includes timestamped vectors of kinematic sensor data elements and behavioral sensor data elements. Each kinematic sensor data element and each behavioral sensor data element is acquired by at least one sensor on board a vehicle, such as the engine, turbine, and auxiliary power unit (APU) sensors 110, flight controls and actuation sensors 120, cockpit control sensors 130, and/or landing gear and brakes sensors 140 of FIG. 1A. The timestamped vectors may be stored as rows in a table, or records in a database. Each timestamped vector may include a vehicle identifier, a timestamp, at least one kinematic sensor reading, and at least one behavioral sensor reading. Each timestamped vector may further include a vehicle type, a version number, an engine type, and/or a pilot identifier.

In various embodiments, before uploading the flight dataset, the computing system 1110 labels each timestamped vector element field as a timestamp, a flight identifier, a kinematic sensor data element, a behavioral sensor data element, or a descriptive metadata field. Once the timestamped vector elements are labeled, flight datasets with the same, previously labeled format can be uploaded and processed. The labels may correspond to column headings in a table of timestamped vector elements, or field names in a database in which the timestamped vector elements are stored. In various embodiments, the labels are used to form and instantiate a database schema. In various embodiments, a Java class represents the incoming data. In various embodiments, data files including the flight datasets are stored and transferred as text files in a comma separated format.

At 520, the computing system 1110 assigns each timestamped vector of the flight dataset to a kinematic cluster. The kinematic clusters partition the dataset into different regions in a kinematic space, that corresponds to different ranges of movement. For example, a helicopter hovering in place has different ranges of movement, as measured by kinematic sensors, than the same helicopter taking off, moving forward at a substantially constant altitude, or landing. Each timestamped vector is assigned to the closest kinematic cluster in a kinematic feature space. In various embodiments, the closest kinematic cluster is the kinematic cluster that the timestamped vector is closest to, as measured by a Euclidean distance, a Mahalanobis distance, or other normalized distance, to the centroid of each kinematic cluster. If the distance of the timestamped vector to the closest kinematic vector exceeds a distance threshold, the timestamped vector may be flagged as not belonging to any kinematic cluster.

In order to assign each timestamped vector, the computer system 110 may train one or more machine learning models on a training set of timestamped kinematic sensor vectors from multiple flight datasets. For example, the trained machine learning models may generate kinematic clusters that correspond to different flight phases of FIG. 2, climb 220, cruise1 225 maneuver1 230, cruise2 235, maneuver 2 240, and descend 245. As noted above, each of these phases correspond to different combinations of vehicle acceleration, ascents or descents, and/or turns, that are measured by kinematic sensors. In various embodiments, the training may include applying a clustering technique on the training data to generate the clusters, and then assigning timestamped vectors to the generated clusters. In various embodiments, the MAPPER algorithm from the field of Topological Data Analysis may be used to generate the clusters, and then assign timestamped vectors to the generated clusters in 520. The MAPPER algorithm partitions a dataset into overlapping regions, applies a cluster algorithm such as k-means clustering to each region, and combines the clusters to generate a global clustering across the regions. This approach enables better handling of heterogeneous datasets than traditional approaches. Because cluster analysis is performed independently in the smaller overlapping regions, more complex machine learning methods can be used. In various embodiments, the Mapper algorithm, or another clustering algorithm, may use k-means clustering, hierarchical clustering, or another clustering approach to generate the clusters, and then assign timestamped vectors to the generated clusters.

Once clusters are generated using the training set, at 520 the computing system 1110 assigns a kinematic cluster to each timestamped vector using the generated kinematic clusters.

At 530, the computing system identifies behavioral sensor data that is anomalous or out-of-bounds for the assigned kinematic cluster of the timestamped vector. For example, data for each behavioral sensor may follow an expected probability distribution function for its assigned kinematic cluster. For example, behavioral sensor data readings close to the peak of the PDF 430 of FIG. 4C is expected, but a behavioral sensor reading in either the lower tail 432 or upper tail 434 of PDF 430 is anomalous and therefore tagged as an alert. The behavioral sensor value may be anomalous for a corresponding kinematic cluster when the behavioral sensor value differs from the expected sensor value for the corresponding kinematic cluster by more than a normalized threshold. In various embodiments, the normalized threshold may correspond to a z-score of, for example, 2, 2.5, 3, or more standard deviations.

At 540, the computing system 1110 generates an alert criticality score for each combination of kinematic cluster and behavioral sensor with anomalous sensor data. Each anomalous behavioral sensor data reading identified in 530 above may be stored in an anomalous reading dataset, with the vehicle identifier, datetime of the reading, kinematic cluster, behavioral sensor identifier, and behavioral sensor value for each. In various embodiments, the timestamped vectors of kinematic sensor data and behavioral sensor data for each kinematic cluster are ordered by time. Once ordered by time, the behavioral sensor values may be filtered. In various embodiments, the behavioral sensor values are filtered with a double exponential moving average, such as Holt-Winters double exponential smoothing filter. Generating the alert criticality score for each combination of kinematic cluster and behavioral sensor with anomalous sensor data may include computing, over a time window, each alert criticality score as the absolute value of the difference between a stationary average and a moving average of the corresponding behavioral sensor, divided by the moving average of the corresponding behavioral sensor. The time window may be over a configurable period, such as 5, 10, 15, or 20 seconds. The higher the criticality score, the higher priority the alert is for users. Generating the alert criticality score for each combination of kinematic cluster and behavioral sensor with anomalous sensor data may include comparing each alert criticality score to a minimum threshold for an alert.

At 550, the computing system 1110 aggregates the generated alert criticality scores into a first alert vector. The first alert vector may include at least one ordered pair of a behavioral sensor labels paired with an anomalous behavioral sensor value that exceeds an alert criticality threshold.

At 560, the computing system 1110 identifies previous flights with an alert vector similar to the first alert vector, the identified previous flights having subsequent maintenance actions and follow-on flights. The alert vector for the previous flight may be similar to the first alert vector when a distance between the alert vector for the previous flight and the first alert vector is less than a threshold in a behavioral sensor value space. The distance between the alert vector for the previous flight and the first alert vector may be a normalized Mahalanobis distance.

Maintenance actions may be stored in a database that includes a description of each maintenance action, the vehicle identifier, and the datetime for the maintenance action. When combined with flight datasets, the database makes it possible to compare the impact of different maintenance actions.

For example, a flight dataset from a helicopter includes alert criticality scores for oil pressure, oil temperature, and voltage level of 19, 41, and 27, respectively. At 560, the computing system 1110 queries the database of past helicopter flights or flights within a time window of, for example, 1 hour, with similar alerts for these three behavioral sensors. The length of this time window is configurable, and may be 5, 10, 20, 30, 45, 60, 90, or 120 minutes. An alert is similar if it has the same, or nearly the same, alert criticality score. For example another flight with alert criticality scores of 20, 41, and 27 for oil pressure, oil temperature, and voltage level may be considered sufficiently close, while alert criticality scores of 19, 41, and 44 might not. At 560, the computing system 1110 uses a distance measure, such as a Euclidean distance or normalized Mahalanobis distance, to identify flights with similar alerts.

At 570, the computing system 1110 selects the subsequent maintenance action with the greatest impact score on follow-on flights. At 570, the computing system 1110 generates an impact score for each of the identified previous flights of the respective maintenance action on the respective follow-on flight. At 570, the computing system 1110 generates a composite impact score for each maintenance action. At 570, the computing system 1110 selects the maintenance action with the largest composite impact score. Each impact score may quantify the impact of the maintenance action on the corresponding follow-on flight by summing the differences between alert criticality scores for each behavioral sensor for the follow-on flight after the maintenance action from the corresponding alert criticality scores for each behavioral sensor from the previous flight before the maintenance action. Generating a composite impact score for each maintenance action may include determining an average impact score for the follow-on flights following each respective maintenance action.

Returning to the helicopter example, at 570, the computing system 1110 removes from consideration any of the flights returned by the query at 560 that were not followed by a maintenance action and a subsequent follow-on flight. At 570, the computing system 1110 calculates the impact of the intervening maintenance action on the follow-on flight for each remaining candidate. In an embodiment, the impact score is the reduction in alert criticality for each relevant behavioral sensor. At 570, the computing system 1110 aggregates the impact scores for each maintenance operation that was performed on the remaining candidates. In various embodiments, aggregation includes averaging impact scores. At 570, the the computing system 1110 outputs or presents a user with the recommended maintenance actions that had the greatest positive impact.

Figure 6:
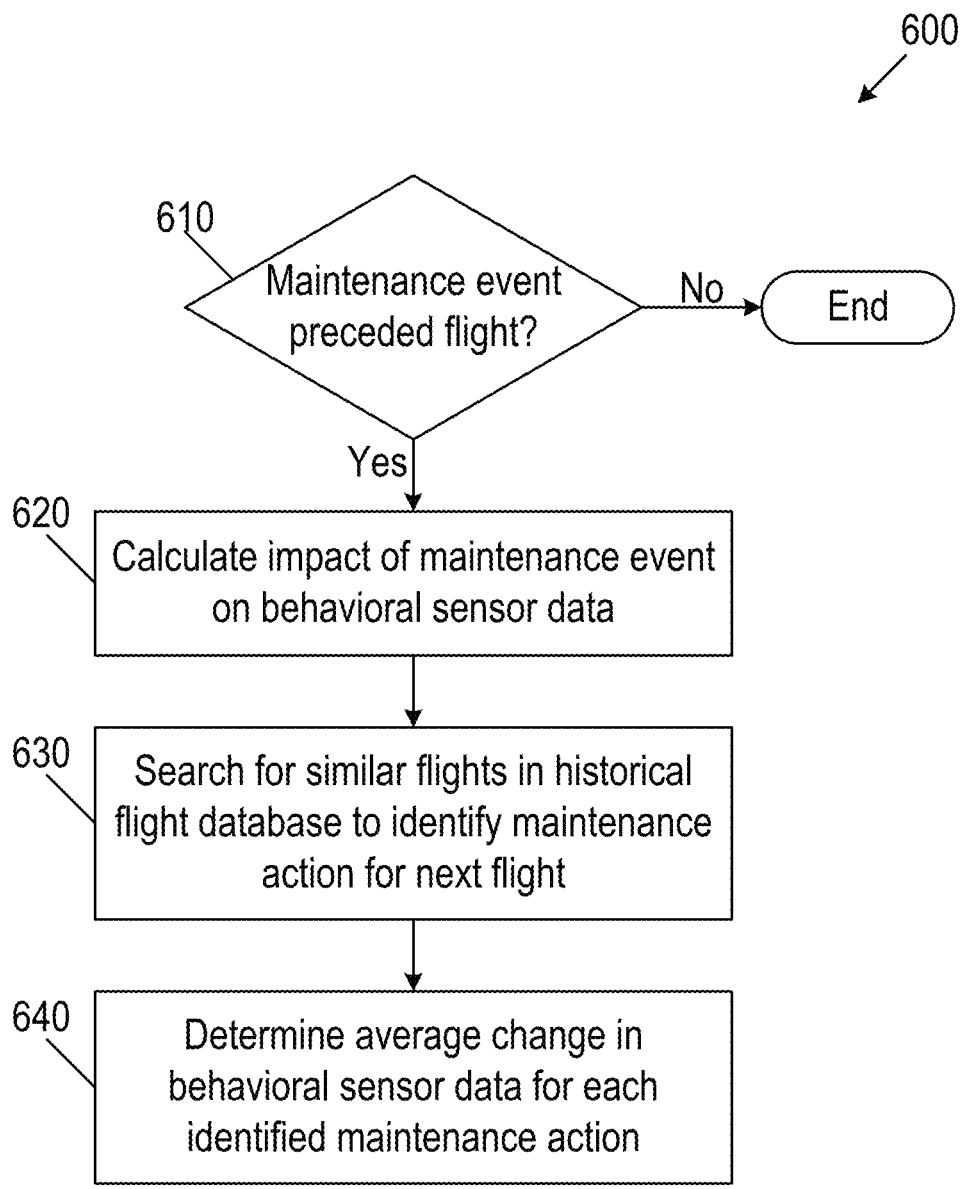
FIG. 6 is a flowchart of a method to annotate a flight dataset with flight regimes, in accordance with some example embodiments.

FIG. 6 is a flowchart of a process 600 to annotate a flight dataset with flight regimes, meaning that every time instant of a flight is associated with exactly one flight regime. This enables the process 600, or an analyst using process 600, to generate a view of a flight as a sequence of flight regime spans. The process 600 assesses flight regime trends before and after a maintenance action, represented by a maintenance datum, to determine the impact of that maintenance action on the overall vehicle's health. Referring to FIGS. 1A, 1B, and 6, the process 600 may be performed by the computing system 1100. To do this, after a flight dataset is received by the system, at 610 the computing system 1110 determines whether there was a maintenance event preceding the flight. If there was, process 600 continues to 620.

At 620 the computing system 1110 calculates impact of a maintenance action by comparing each vehicle health indicator in the prior flight against that indicator in the current flight, providing a set of changes in vehicle health indicators due to maintenance. In various embodiments vehicle health indicators correspond to behavioral sensor values, or combinations of behavioral sensor values.

At 630 the computing system 1110 determines which, if any, maintenance action would produce the best performance improvement. To do this, process 600 performs a search for flights in the historical flight database that are most similar to the flight in question, as measured by distance in a vehicle health indicator feature space. Similarity is assessed by constructing a vector for each flight from its health indicators, and then using a Euclidean metric to calculate distance. Those flights within a certain distance (with a threshold parameter supplied from an external configuration file) have similar vehicle health indicators. A Mahalanobis distance may be used to normalize for differences in variance over different dimensions.

At 640, with these similar flights in hand, the computing system 1110 looks at the next flight by that vehicle (if one exists) as well as any maintenance actions taken between that flight and the next. The process reduces this set down to determine what the average change for each maintenance action is, including the null case of no maintenance action performed, to give end users an understanding of which maintenance actions could provide the best performance improvement, in terms of vehicle health indicators, for the flight in question.

For example, flight 123 has been completed, and its flight data has been uploaded to the vehicle maintenance system. At 640 the computing system 1110 determines that a maintenance action was performed prior to this flight, and logs the impact of that action based on the vehicle health indicators from Flight 123 and this vehicle's previous flight.

An aircraft maintainer reviews the flight data and notes that some health indicators are showing degradations in behavior. He asks the system to show him the maintenance actions that have led to the best improvement in these health indicators, and within seconds is given a sorted list of actions, along with supporting information to dive further into the fleet's maintenance history.

Figure 7:
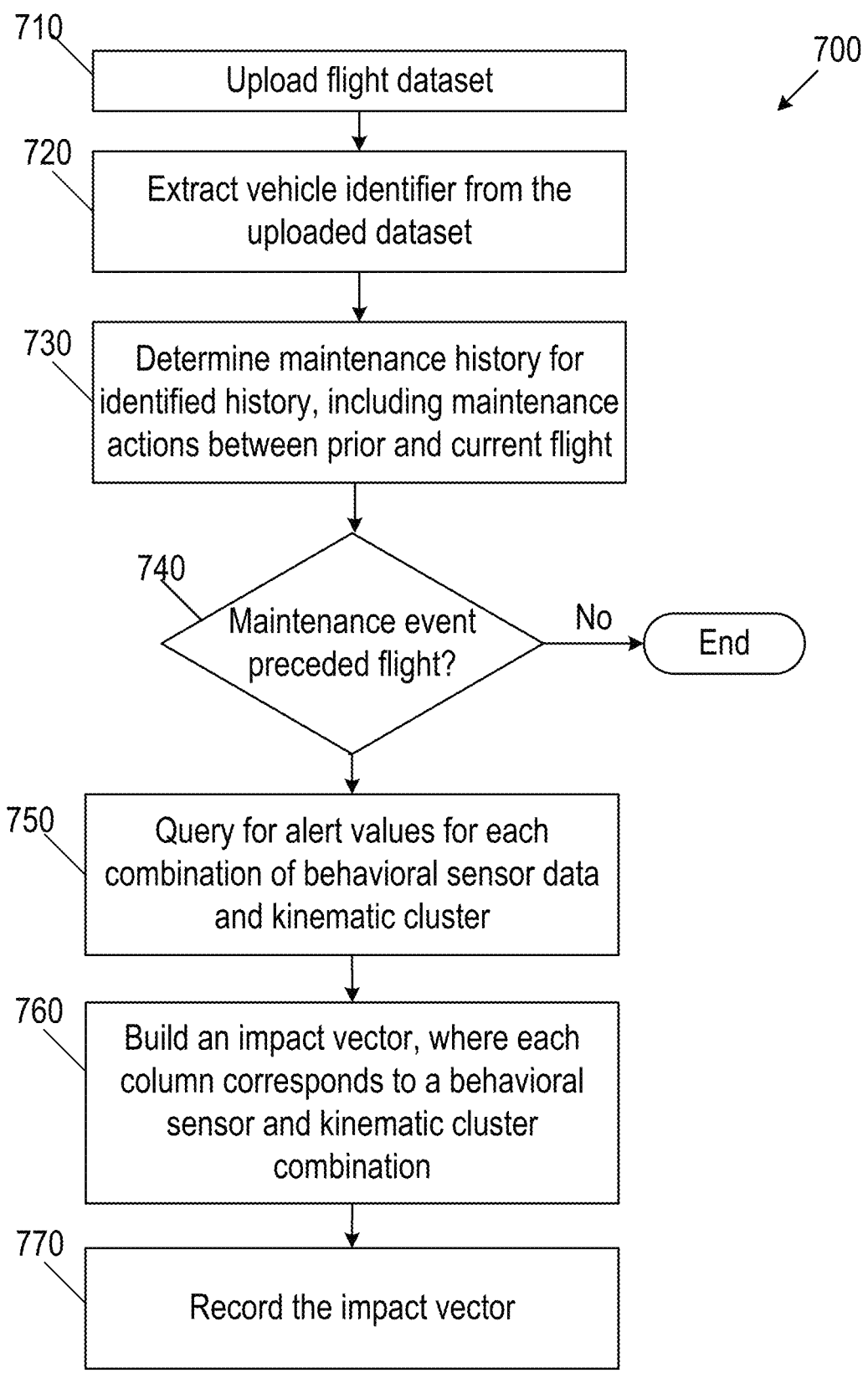
FIG. 7 is a flowchart of an impact determination method, in accordance with some example embodiments.

FIG. 7 is a flowchart of an impact determination process 700 according to an embodiment of the disclosed technology. Referring to FIGS. 1A, 1B, and 7, the process 700 may be performed by the computing system 1100.

At 710, the computing system 1110 uploads a flight dataset to the system. The flight dataset may be uploaded wirelessly, by wire, or via a portable storage device. The flight data set includes a vehicle identifier and sensed data from on-board behavioral and kinematic sensors.

At 720, the computing system 1110 extracts a vehicle identifier from the uploaded dataset.

At 730, the computing system 1110 queries a maintenance dataset to determine a maintenance history for the identified vehicle, including maintenance actions performed between the prior and current flight.

At 740, the computing system 1110 determines if maintenance was performed since the previous flight. If not, the process stops. If maintenance was performed, the process proceeds to 750.

At 750, the computing system 1110 queries for alert values for each combination of behavioral sensor and kinematic cluster. For example, if there are 2 sensors (A and B) and 3 kinematic clusters (1, 2, and 3), then process 200 queries for alert values from the prior flight for A1, A2, A3, B1, B2, and B3.

At 760, the computing system 1110 builds an impact vector, where each column corresponds to a behavioral sensor value and kinematic cluster combination and the value is the current flight's value minus the prior flights value.

At 770, the computing system 1110 records the impact vector associated with the vehicle identifier, flight identifier, and the kinds of maintenance actions performed.

Figure 8:
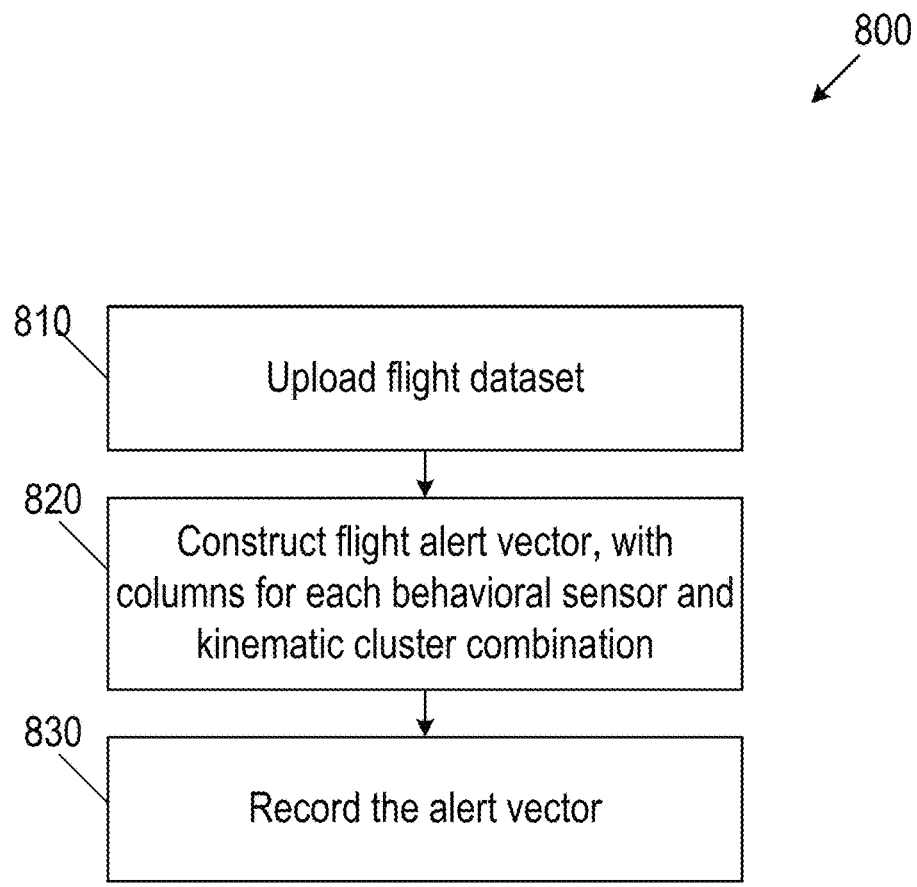
FIG. 8 is a flowchart of an alert vector workflow method, in accordance with some example embodiments.

FIG. 8 is a flowchart of an alert vector workflow process 800 according to an embodiment of the disclosed technology. Referring to FIGS. 1A, 1B, and 8, the process 800 may be performed by the computing system 1100.

At 810, the computing system 1110 uploads a flight dataset to the system. The flight dataset may be uploaded wirelessly, by wire, or via a portable storage device. The flight data set may be uploaded after landing, or while the vehicle is in flight. The flight data set includes a vehicle identifier and sensed data from on-board sensors, including at least one of engine, navigation, and avionics sensors, to provide kinematics, flight regime, engine and/or avionics data.

At 820, the computing system 1110 constructs the flight's alert vector. In various embodiments, this alert vector's columns are every combination of behavioral sensor and kinematic cluster, sorted alphanumerically, with values being the 'alert severity', a score internally calculated after every flight. Alert severity is calculated by first counting the number of anomalies for a sensor for each kinematic cluster during the flight. An anomaly is a sensor value either greater than the high fence or less than the low fence of the sensor values in a maneuver or corresponding kinematic cluster. The high fence for a set of values is the median of the values plus the inter-quartile range, while the low fence is the median minus the inter-quartile range. The inter-quartile range for a set of values is the difference between the $75^{th}$ percentile value and the $25^{th}$ percentile value. When the number of anomalies for a sensor in a kinematic cluster during a flight is calculated, it is divided by the total number of sensor values in that kinematic cluster for that flight, and then multiplied by 10 (in order to produce a value that ranges from 0 to 10). These alert severity scores are real-valued numbers between 0 and 10. The system maintains a table of these vectors, each associated with the flight's identifier as a key.

At 830, the computing system 1110 records the alert vector associated with the behavioral sensor, kinematic cluster, and alert severity.

Figure 9:
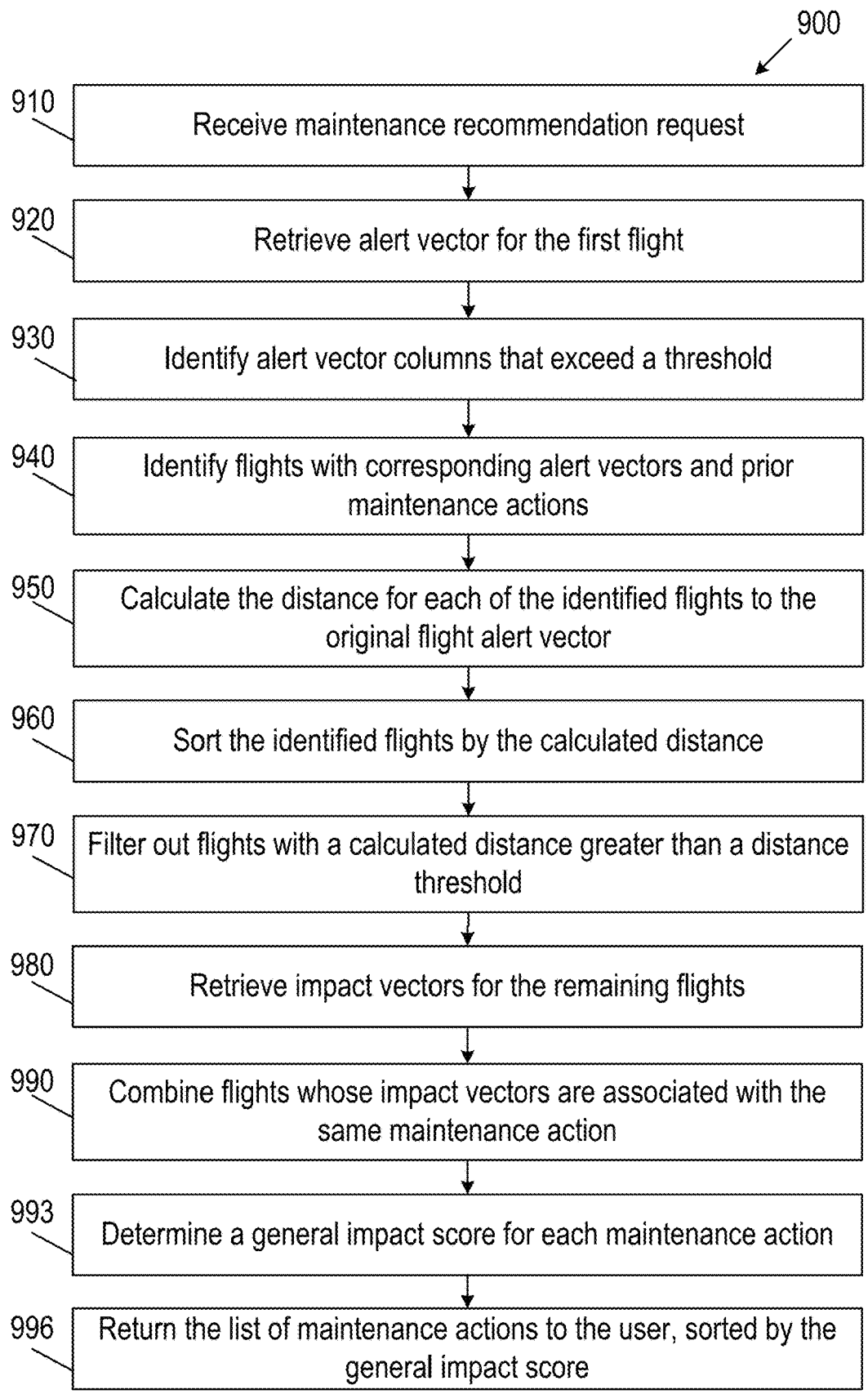
FIG. 9 is a flowchart of a maintenance recommendation method, in accordance with some example embodiments.

FIG. 9 is a flowchart of a maintenance recommendation process 900 according to an embodiment of the disclosed technology. Referring to FIGS. 1A, 1B, and 9, the process 900 may be performed by the computing system 1100.

At 910, the computing system 1110 receives a request from a user via a user interface I/O device 1117 requesting maintenance recommendations for a first flight.

At 920, the computing system 1110 retrieves the alert vector for the first flight.

At 930, the computing system 1110 identifies alert vector columns for the first flight that have values above a threshold, indicating an area of concern. In an embodiment, the threshold is 7. Other embodiments may use different thresholds.

At 940, the computing system 1110 identifies flights with corresponding alert vectors and prior maintenance actions. At 940, the computing system 1110 queries the system for all flights other than the first flight that meet the following two conditions. First, the corresponding alert vectors for the other flights include columns, corresponding to the areas of concern for the first flights, with values above threshold. For example, if the first flight has an alert vector with values above the threshold in the 3rd and 5th columns, then at 930, the computing system 1110 selects the other flights whose alert vectors have values above 7 in the 3rd and 5th columns. The flights identified by the query are referred to as queried flights. Second, the corresponding alert vectors for the other flights had a prior maintenance action. The prior maintenance action is found by querying for the presence of an impact for each of the other flight identifiers. The other flights that meet these two conditions are the second set of flights.

At 950, the computing system 1110 calculates, for each of the second set of flights, a distance between that flight's alert vector and the original flight's alert vector. In an embodiment, the distance is a Euclidean distance. In some example embodiments, the distance may be a Mahalanobis distance, although other distance metrics may be used as well.

At 960, the computing system 1110 sorts the queried flights with this calculated distance.

At 970, the computing system 1110 retrieves the flight similarity threshold value, provided in a configuration file at system start-up, and filters out flights in the second set of flights whose Euclidean distance is greater than the threshold.

At 980, the computing system 1110 retrieves, for the remaining flights, the impact vectors for each. These remaining flights are those flights that were not filtered out in the previous step; that is, this is the set of flights whose alert vectors are sufficiently close to the alert vector for the flight in question, where 'sufficiently close' means the Euclidean distance between the alert vectors is less than the (configured) threshold.

At 990, the computing system 1110 combines flights whose impact vectors are associated with the same maintenance action type, by calculating the average value for each column in the impact vectors.

At 993, the computing system 1110 determines the general impact score as follows. For each combined impact vector, add it to the original alert vector and take the sum of the column values. The general impact score can thus be conveyed as:

gis=sum(sum(civ[$i$]+oav[$i$]) for civ in {civ}), where oav is the original alert vector, {civ} is the set of combined impact vectors, gis is the general impact score, n is the number of columns in the oav (and in each civ), and v[$i$] is the $i^{th}$ value in vector v.

At 996, the computing system 1110 returns the list of maintenance actions to the user, sorted by general impact score from greatest to least.

Figure 10:
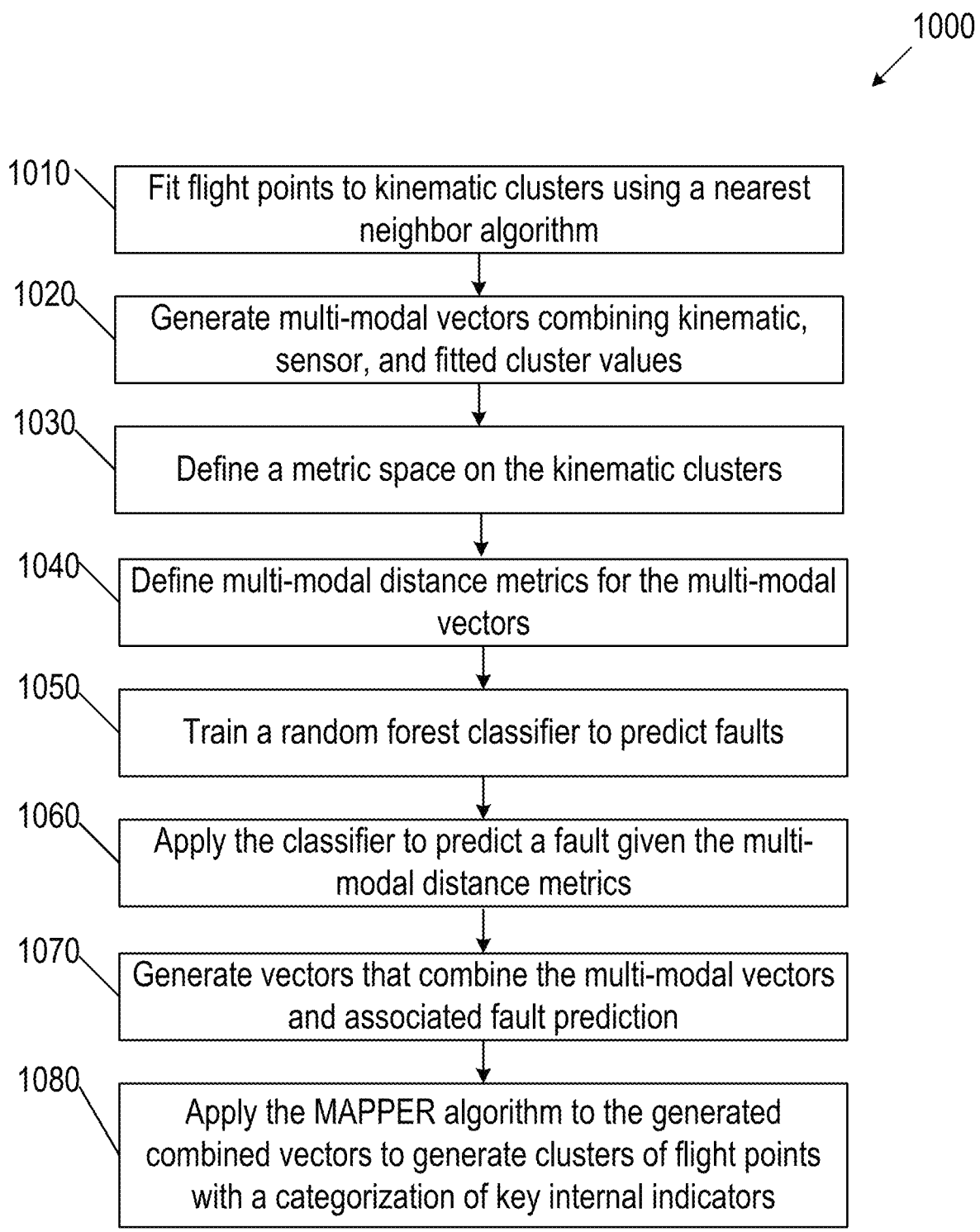
FIG. 10 is a flowchart of a method for maintaining aircraft, in accordance with some example embodiments.

FIG. 10 is a flowchart of a process 1000 according to example embodiments of the disclosed technology. Referring to FIGS. 1A, 1B, and 10, the process 1000 may be performed by the computing system 1100.

At 1010, the computing system 1110 starts with a dataset of flight points from an operation, a dataset of faults from that operation, and a set of kinematic clusters that have been created. At 1010, the computing system 1110 uses nearest-neighbor clustering to fit every flight point to a kinematic cluster.

At 1020, the computing system 1110 uses the result of 1010 to transform every flight point into a vector composed of the flight point's numeric kinematic values, its numeric behavioral sensor values, and the categorical identifier of the fitted cluster.

At 1030, the computing system 1110 defines a metric space on the kinematic clusters, where the distance between two clusters is a distance of their respective centers. In some example embodiments, the distance may be a Euclidean distance, although other distance metrics can be used as well. The center of a kinematic cluster is the flight point in the cluster that minimizes the average distance to all other flight points in that cluster.

At 1040, the computing system 1110 defines a multi-modal distance metric for the multi-modal vectors. In some example embodiments, the distance is based on a normalized Euclidean metric for the numeric values and the metric defined above for the kinematic cluster identifier. Using this multi-modal metric, at 1040, the computing system 1110 embeds the multi-modal vectors into a low-dimensional manifold using a dimensionality reduction technique, such as t-distributed stochastic embedding (t-SNE), principal component analysis (PCA), linear discriminant analysis, or a generalized discriminant analysis. For example, the computing system 1110 may use t-SNE, a non-linear dimensionality reduction technique that represents a high-dimensional vector in, for example, a 2- or 3-dimensional Euclidean space.

At 1050, the computing system 1110 uses these embedded vectors to train a classifier to predict the presence of a fault at that flight point. In example embodiments, the classifier can include a decision tree, a Bayesian classifier, a support vector machine, a quadratic classifier, and/or a neural network. For example, the computing system 1110 can include a random forest decision tree and/or use a technique such as cross-validation to optimize the choice of hyper-parameters. Hyper-parameters are those parameters used in a machine learning algorithm that are set prior to running the algorithm. For example, the number of clusters in a k-means cluster analysis or the number of trees in a random forest classifier.

At 1060, the computing system 1110 predicts the presence of a fault given a flight point using the hyper-parameters determined at 1040.

At 1070, the computing system 1110 builds a set of vectors that are the original multi-modal vectors with the prediction of a fault appended.

At 1080, the computing system 1110 generates clusters of flight points to categorize key internal indicators using a machine learning method, such as topological clustering, hierarchical clustering, centroid-based clustering, distribution-based clustering, or density based clustering, For example, the computing system 1110 can use the MAPPER algorithm. The computing system 1110 can apply MAPPER to the vector set, using a version of the multi-modal distance metric described above that has been extended with a Euclidean metric for the 'fault' dimension. MAPPER is a cluster analysis technique drawn from the field of Topological Data Analysis that enables complex distance metrics and low-scale cluster analysis to be applied to large datasets.

For example, sensor data was collected for a fleet of armored cars. The armored car dataset included 58.55 hours of drive time, with data from 300 on board sensors taken at various frequencies. The armored car dataset included data from six kinematic sensors that measured torque delivered by the engine, torque demanded by the driver, left front axle speed, right front axle speed, left rear axle speed, and right rear axle speed.

Kinematic clusters were generated from a training set based on a random sample of operations from the armored car dataset. The operations together constituted approximately 20 hours of drive time. An operation was defined as data from a single vehicle with no more than a 5 minute gap between data points. The resulting model yielded five kinematic clusters A-E. Table 1 lists the average values of each kinematic sensor for each of the five kinematic clusters. The values are unitless, normalized, and rounded to the nearest integer, as follows.

TABLE 1

Kinematic clusters from armored car training set

| Kinematic sensor | Cluster A | Cluster B | Cluster C | Cluster D | Cluster E | All |
|---|---|---|---|---|---|---|
| Delivered torque | 115 | 134 | 142 | 143 | 140 | 132 |
| Demanded torque | 115 | 125 | 125 | 125 | 125 | 123 |
| Left front axle speed | 0 | 0 | 5 | 394 | 625 | 9 |
| Right front axle speed | 0 | 0 | 5 | 397 | 630 | 9 |
| Left rear axle speed | 0 | 0 | 5 | 372 | 626 | 9 |
| Right rear axle speed | 0 | 0 | 4 | 371 | 627 | 9 |

The five clusters A, B, C, D, and E partition the time-stamped vectors for the armored car as follows. In clusters A and B, the vehicle is not moving, as axle speeds average 0. In cluster B, torque demand and delivered are higher than for cluster A. In cluster C, the vehicle moves slowly, with axle speeds of 4 or 5. In cluster D, the vehicle moves at a moderate speed, with average front axle speeds close to 400, and average rear axle speeds close to 370. In cluster E, the vehicle moves quickly, with average front and rear axle speeds close to 625. These five clusters segment the kinematic space in understandable clusters. Without clustering, all of timestamped vectors are considered together. On average, axle speeds are low (close to 9, relatively close to cluster C), and average torque measurements of 132 for delivered torque and 123 for demanded torque, which are relatively close to cluster B.

Figure 11:
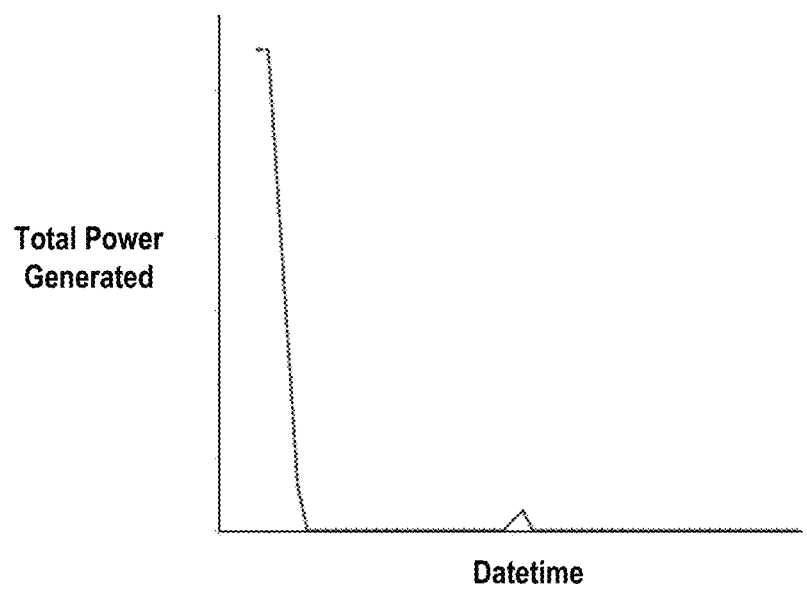
FIG. 11 is a graph of Total Generator Power for an armored vehicle during a trip.

FIG. 11 is a graph of Total Generator Power for a trip for Vehicle-1. The timestamped vector was clustered into the five kinematic clusters A-E, summarized above. The first three minutes are in cluster B, with high delivered torque. To deliver these high torque values, the generator needs to deliver significant power. Values between 5,000 and 80,000 are expected for a Total Generator Power sensor reading. However, these values would be flagged as anomalous if clusters were not applied. Similarly, high VHC Bus Voltages would be flagged unless kinematic clusters are considered. The high VHC Bus Voltage and high Total Generator Power readings resulted in misleading alert scores of 2257 and 421, respectively when kinematic clusters were not applied. With kinematic clusters, the VHC Bus Voltages and Total Generator Power readings during the first three minutes of this trip for Vehicle-1 are not flagged because they are expected for cluster B. These are just two examples of behavioral sensor readings that are only correctly interpreted with the introduction of kinematic clusters. The kinematic clusters also make it possible to identify anomalous readings for a particular kinematic cluster.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    memory storing instructions which, when executed by the at least one data processor, result in operations comprising:
        uploading a flight dataset, the flight dataset comprising a plurality of time stamped vectors of kinematic sensor data and behavioral sensor data, each kinematic sensor data and each behavioral sensor data acquired by at least one sensor on board a vehicle;
        assigning, to a kinematic cluster, each timestamped vector of the flight dataset by at least applying a machine learning model trained to differentiate between kinematic sensor data associated with different kinematic dimensions;
        identifying behavioral sensor data that is anomalous for the assigned kinematic cluster of the timestamped vector;
        generating an alert criticality score for each combination of kinematic cluster and behavioral sensor data with anomalous sensor data;
        aggregating the generated alert criticality scores into a first alert vector;
        identifying previous flights with an alert vector corresponding to the first alert vector, the identified previous flights having subsequent maintenance actions and follow-on flights;
        generating an impact score for each of the identified previous flights having the maintenance actions and the follow-on flights;
        generating a composite impact score for each subsequent maintenance action;
        selecting the subsequent maintenance action with the largest composite impact score; and
        presenting, at a user interface, the selected, subsequent maintenance action with the largest composite impact score.

2. The system of claim 1, wherein the vehicle is at least one of a fixed wing aircraft, a rotary wing aircraft, an autonomous vehicle, a remotely controlled vehicle, or a piloted vehicle.

3. The system of claim 1, wherein each timestamped vector comprises a vehicle identifier, a timestamp, at least one kinematic sensor reading, and at least one behavioral sensor reading.

4. The system of claim 3, wherein each timestamped vector further comprises at least one of a vehicle type, a version number, an engine type, or a pilot identifier.

5. The system of claim 1, further comprising labeling the flight dataset as the kinematic sensor data or the behavioral sensor data.

6. The system of claim 1, wherein assigning each timestamped vector of the flight dataset to the kinematic cluster comprises generating the kinematic clusters, wherein generating the kinematic clusters comprises training the machine learning model on a training set of timestamped kinematic sensor vectors from a plurality of flight datasets.

7. The system of claim 6, wherein the training of the machine learning model comprises applying a clustering method.

8. The system of claim 7, wherein the clustering method comprises a MAPPER algorithm.

9. The system of claim 8, wherein the clustering method further comprises at least one of a k-means clustering algorithm or a hierarchical clustering algorithm.

10. The system of claim 1, wherein the behavioral sensor data is anomalous for the kinematic cluster when the behavioral sensor data differs from an expected sensor value for the kinematic cluster by more than a normalized threshold.

11. The system of claim 10, wherein a distribution of the behavioral sensor data for the corresponding kinematic cluster has a Gaussian distribution, and wherein the normalized threshold corresponds to a z-score of two standard deviations.

12. The system of claim 1, wherein the behavioral sensor data for a kinematic cluster are filtered with a double exponential moving average filter.

13. The system of claim 1, wherein generating the alert criticality score for each combination of kinematic cluster and behavioral sensor data with anomalous sensor data comprises:
    ordering timestamped vectors of the kinematic sensor data and the behavioral sensor data for each kinematic cluster by time;
    computing, over a time window, each alert criticality score as an absolute value of a difference between a stationary average and a moving average of the corresponding behavioral sensor data, divided by the moving average of the corresponding behavioral sensor data; and comparing each alert criticality score to a minimum threshold for an alert.

14. The system of claim 1, wherein the first alert vector comprises at least one ordered pair of a behavioral sensor labels paired with an anomalous behavioral sensor data that exceeds an alert criticality threshold.

15. The system of claim 1, wherein the alert vector for the previous flight corresponds to the first alert vector, when a distance between the alert vector for the previous flight and the first alert vector is less than a threshold in a behavioral sensor value space.

16. The system of claim 15, wherein the distance between the alert vector for the previous flight and the first alert vector is a normalized Mahalanobis distance.

17. The system of claim 1, wherein each impact score quantifies an impact of the subsequent maintenance action on the follow-on flight, by summing differences between alert criticality scores for each behavioral sensor data for the follow-on flight after the subsequent maintenance action from the corresponding alert criticality scores for each behavioral sensor data from the previous flight before the subsequent maintenance action.

18. The system of claim 17, wherein generating a composite impact score for each maintenance action comprises determining an average impact score for the follow-on flights following each subsequent maintenance action.

19. A computer-implemented method comprising:
uploading a flight dataset, the flight dataset comprising a plurality of time stamped vectors of kinematic sensor data and behavioral sensor data, each kinematic sensor data and each behavioral sensor data acquired by at least one sensor on board a vehicle;
assigning, to a kinematic cluster, each timestamped vector of the flight dataset by at least applying a machine learning model trained to differentiate between kinematic sensor data associated with different kinematic dimensions;
identifying behavioral sensor data that is anomalous for the assigned kinematic cluster of the timestamped vector;
generating an alert criticality score for each combination of kinematic cluster and behavioral sensor data with anomalous sensor data;
aggregating the generated alert criticality scores into a first alert vector;
identifying previous flights with an alert vector corresponding to the first alert vector, the identified previous flights having subsequent maintenance actions and follow-on flights;
generating an impact score for each of the identified previous flights having the maintenance actions and the follow-on flights;
generating a composite impact score for each subsequent maintenance action;
selecting the subsequent maintenance action with the largest composite impact score; and
presenting, at a user interface, the selected, subsequent maintenance action with the largest composite impact score.

20. A non-transitory computer-readable medium storing instructions, which when executed by at least one data processor, result in operations comprising:
uploading a flight dataset, the flight dataset comprising a plurality of time stamped vectors of kinematic sensor data and behavioral sensor data, each kinematic sensor data and each behavioral sensor data acquired by at least one sensor on board a vehicle;
assigning, to a kinematic cluster, each timestamped vector of the flight dataset by at least applying a machine learning model trained to differentiate between kinematic sensor data elements associated with different kinematic dimensions;
identifying behavioral sensor data that is anomalous for the assigned kinematic cluster of the timestamped vector;
generating an alert criticality score for each combination of kinematic cluster and behavioral sensor data with anomalous sensor data;
aggregating the generated alert criticality scores into a first alert vector;
identifying previous flights with an alert vector corresponding to the first alert vector, the identified previous flights having subsequent maintenance actions and follow-on flights;
generating an impact score for each of the identified previous flights having the maintenance actions and the follow-on flights;
generating a composite impact score for each subsequent maintenance action;
selecting the subsequent maintenance action with the largest composite impact score; and
presenting, at a user interface, the selected, subsequent maintenance action with the largest composite impact score.

* * * * *